(12) United States Patent
Sckerl

(10) Patent No.: US 6,920,254 B1
(45) Date of Patent: Jul. 19, 2005

(54) METHOD FOR CONTROLLING THE POLARIZATION OF AN OPTICAL SIGNAL AND AN OPTICAL COMPONENT FOR POLARIZATION CONTROL OF LIGHT IN PLANAR WAVEGUIDES

(75) Inventor: Mads W. Sckerl, Copenhagen (DK)

(73) Assignee: Ignis Photonyx AS, Horten (NO)

( * ) Notice: Subject to any disclaimer, the term of this patent is extended or adjusted under 35 U.S.C. 154(b) by 0 days.

(21) Appl. No.: 09/958,007

(22) PCT Filed: Mar. 29, 2000

(86) PCT No.: PCT/DK00/00150

§ 371 (c)(1),
(2), (4) Date: Feb. 13, 2002

(87) PCT Pub. No.: WO00/60404

PCT Pub. Date: Oct. 12, 2000

(30) Foreign Application Priority Data

Mar. 31, 1999 (DK) ........................ 1999 00452

(51) Int. Cl.⁷ ................................ G02F 1/01
(52) U.S. Cl. ................ 385/11; 385/1; 385/4; 385/8
(58) Field of Search ............... 385/11, 1, 4, 8

(56) References Cited

U.S. PATENT DOCUMENTS

| | | |
|---|---|---|
| 4,781,424 A | 11/1988 | Kawachi et al. |
| 4,923,290 A | 5/1990 | Brinkmeyer et al. |
| 4,958,918 A | 9/1990 | Walker |
| 4,978,188 A * | 12/1990 | Kawachi et al. ............ 385/130 |
| 5,347,377 A | 9/1994 | Revelli, Jr. et al. |
| 5,471,545 A | 11/1995 | Negami et al. |
| 5,502,781 A | 3/1996 | Li et al. |

FOREIGN PATENT DOCUMENTS

EP   0297851 A2   1/1989

OTHER PUBLICATIONS

Masayuki Okuno et al. "Birefringence Control Of Silica Waveguides On SI And Its Application To Polarization–Beam Splitter/Switch". Journal of Lightwave Technology, vol. 12, No. 4; Apr. 1994, pp. 625–633.

* cited by examiner

Primary Examiner—Rodney Bovernick
Assistant Examiner—Sung Pak
(74) Attorney, Agent, or Firm—Merchant & Gould

(57) ABSTRACT

By a method for controlling the state of polarization (SOP) of an optical signal transmitted through an optical waveguide, the waveguide is buried in a planar structure and a plurality of stress-applying films, having variable stress, are placed on the top of the structure. Preferably the stress-applying films comprise materials that have thermal expansion coefficients different from that of the planar structure or comprise materials with piezoelectric properties. In this way it is possible to produce a cascaded series of optical elements with variable linear birefringence in a planar optical waveguide. Moreover according to the invention it is possible, by the method according to the invention, to manufacture optical components having an active polarisation controller.

14 Claims, 4 Drawing Sheets

METHOD FOR CONTROLLING THE POLARIZATION OF AN OPTICAL SIGNAL AND AN OPTICAL COMPONENT FOR POLARIZATION CONTROL OF LIGHT IN PLANAR WAVEGUIDES

The present invention relates to a method for controlling the polarisation of an optical signal transmitted through an optical waveguide. Further the invention relates to an optical component comprising a polarisation controller.

It is well known in the field of optics that the State Of Polarisation (SOP) of a light signal generally is altered by the transmission through optical elements. This is particularly true in the fields of fibre optics and integrated optics, where the birefringence, that governs the changes of the SOP, may be large and may in addition be +greatly affected by the ambient conditions such as temperature and mechanical stress. Hence, such transmission systems often suffer from undesired alterations of the signal SOP.

Since the efficiency of optical components typically depends on the SOP of a light signal, being able to control the polarisation or, as another approach, to diminish the SOP dependence of optical components is crucial. The latter approach, however, has proven difficult for a large number of applications, in particular for coherent transmission systems. Polarisation controllers are, therefore, necessary either as an active component in transmission systems or as a useful component for testing and minimising SOP dependence of optical elements.

Various methods for polarisation control have been used in the art. Generally these methods are based on the synergetic effect of cascaded linearly birefringent elements. It is well know to those skilled in the art, that each such element is specified by the set of principal axes X and Y, and by the birefringence $B=|n_x-n_y|$. Here, $n_{x(y)}$ is the effective refractive index for a propagating mode, linearly polarized along the X(Y) direction.

With a cascaded series (a,b, . . . ) of such components, it is possible to alter the transformation of an input-SOP by controlling the angles between the sets of principal axes $((X_a, Y_a), (X_b, Y_b), \ldots)$ and/or by controlling the bire-fringence $(B_a, B_b, \ldots)$ in each element.

The Poincaré sphere is well known to those skilled in the art as a useful tool for visualising transformations of an optical SOP, such as those caused by a linearly birefringent element. A SOP is specified by a specific point on the surface of the unit sphere. Points on the equator represents states of linear polarisation, the poles right-hand and left-hand circular polarisation, and other points on the sphere represent elliptical polarisation. Moreover, each point on the Poincaré sphere has a unique set of coordinates defined by the sphere's three-dimensional axes (S1, S2, S3). The vector defined by these three coordinates is usually called the normalised Stokes vector. On the Poincaré Sphere, two orthogonal states are located with 180 degrees between their Stokes vectors.

When a signal is propagating through a series of linearly birefringent elements, the SOP follows a path on the Poincaré sphere. Each element rotates the SOP along a circle, with the axis of rotation determined by the directions of the principal axes of the element. By changing the birefringence of the element, all points on the circle may be reached. The radius of the circle vanishes if the input signal is polarised parallel to one of the principal axes, but equals unity for circular states and for linear states angled 45 degrees with respect to the principal axes.

Every point on the Poincaré sphere may be reached by two methods of controlling the properties of each of the birefringent elements. The first method is based on adjusting the birefringence in each element and keeping the angles between the principal axes of each of the elements fixed. The second is based on rotating the principal axes of each element and keeping the birefringences constant. Although usually only one method is chosen a combination between the two may also be used.

Several examples of optical polarisation controllers exist. The differences between these are generally found in the way of obtaining an element with variable birefringence or in the way of obtaining the desired transformation, i.e. by the chosen combination of controlling the birefringence and/or the directions of the principal axes.

Variable birefringence may be obtained by the well known photo-elastic and electro-optic effects. The photo-elastic effect originates in the change in refrative index of a material in the presence of strain caused by a stress field. The electro-optic effect originates in the change in refractive index of a material in the presence of an electric field. It is worth noting that the electro-optic effect is practically non-existing in glass.

A well-known example of a polarisation controller is a cascade of fibre loops. Each birefringent element is based on a length of fibre, looped to obtain stress-induced birefringence. By manually varying the angles between the sets of principal axes any transformation of a SOP may be obtained. Another example is based on a controlled squeezing of a fibre in order to obtain a certain amount of stress-induced birefringence. Here, the angles between the birefringent elements generally remain fixed during operation. The disadvantages of such fibre-based methods are that they only allow for a slow and cumbersome polarisation control, that they are generally bulky of size, and that they cannot be directly integrated with planar optical components.

Another example is a polarisation controller based on a planar optical waveguide in an electro-optical material. By inducing electrical fields in this material waveguide birefringence can be varied in a way to obtain any desired polarisation transformation. By this method the operation may be performed much faster than possible by the larger fibre-based systems. However, one disadvantage is that electro-optical materials compared to glass have large refractive indices causing large insertion losses and reflections, when integrated with the commonly used silica glass based components such as standard fiber.

Although there have been demonstrations of polarisation control in fibres and in planar waveguides of an electro-optic material, a glass-based planar waveguide polarisation control would open up a wide range of possibilities for the fields of integrated optics in glass. This is particularly true if such a device could be easily and effectively integrated with other components on the same chip.

U.S. Pat. No. 4,958,918 discloses a method for obtaining a desired optical polarisation transformation in lithium niobate.

A waveguide was defined in lithium niobate, and buried under a buffer layer supporting a number of electrodes arranged parallel to and symmetrically over the waveguide.

By this method, waveguide birefringence can be induced and controlled by the electric fields created by the electrodes. The advantage of this method is that the desired retardation may be obtained faster than possible by means of manually fibre-optic polarisation controllers. Moreover, a given transformation may be obtained in various ways since both the principal axes and the retardation of each retarding element may be adjusted. The disadvantage, however, is that the method is based on the electro-optic effect, which is practically nonexisting in materials having a refractive index compatible with the commonly used glass materials.

M. Okuno et al. "Birefringence control of silica waveguides on Silicon and its application to a polarisation-beam splitter/switch", Journal of Lightwave Technology, Vol. 12, No. 4, April 1994, p. 625–633, discloses birefringence control in a silica waveguide. Their method is based on laser trimming of a stress-applying amorphous silicon film in order to diminished inherent waveguide birefringence.

By an amorphous silicon film 7 $\mu$m. thick, 50 $\mu$m to 100 $\mu$m wide and a few cm long a stress-induced birefringence of the order of $10^{-4}$ was obtained.

It must be noted that laser trimming is an irreversible process, and that nothing was disclosed about active control of birefringence.

U.S. Pat. No. 4,923,290 discloses a method for producing a polarisation scrambler by inducing stress birefringence in a fibre using electro-magnetically generated force or piezo-ceramical pressure generators.

By this method polarisation states are scrambled in a way that light intensities emerging in each state are substantially equal averaged in time.

Nothing was disclosed about direct polarisation control or about polarisation control in planar waveguides.

U.S. Pat. 5,347,377 discloses a planar waveguide liquid crystal variable retarder.

The authors describe a method based on materials having molecular dipoles. By an electric field induced by a number of electrodes, the birefringence of the liquid crystal material was controlled. The liquid crystal material was carefully embedded in a glass structure on a planar substrate. Nothing was disclosed about variable birefringence in glass.

U.S. Pat. No. 5,502,781 discloses a method for obtaining integrated glass-based optical components insensitive to the polarisation of a signal by utilising magnetostrictively, electrostrictively or photostrictively induced stress. However, nothing was disclosed about polarisation control employing variable linear birefringent waveguide segments with mutually rotated principal axes. Moreover, nothing was disclosed about utilising the stress induced by a difference in thermal expansion coefficients between the used materials.

European patent 0 297 851 discloses a method for compensating for inherent waveguide birefringence by an irreversible laser trimming of a stress-applying film located at the surface of the waveguide structure. By this method the authors claims that a polarisation-insensitive Mach-Zehnder interferometer can be obtained. Nothing was disclosed about a variable waveguide birefringence or about placing the stress-applying film asymmetrically above the waveguide core to obtain birefringent waveguide segments with mutually rotated principal axes.

It is therefore an object of the present invention to provide a method for creating a controllable transformation of an optical State of Polarisation (SOP) in a glass-based planar optical waveguide.

In particular it is an object to create a voltage-controlled polarisation controller, which can transform any input-SOP to any desired output-SOP of a signal transmitted through such a waveguide.

Moreover, it is an object that the method allows for a direct integration of the polarisation controller with other glass-based planar optical components.

This object is achieved according to the present invention by the following steps:
  burying the optical waveguide in a planar structure
  placing a plurality of stress-applying films on the structure in an asymmetrical manner with respect to the waveguide core, said stress being variable.

Thus a method for producing a cascaded series of optical elements with variable linear birefringence in planar optical waveguides is achieved.

It is preferable that said asymmetrical manner in which said stress applying films are placed on top of the structure with respect to the position of the waveguide core comprises placing the films such that a well defined angle between the principal axes of each variable birefringent waveguide segment is obtained.

It is further preferable that said stress-applying films comprise materials which have a thermal expansion coefficient substantially different from that of the underlying waveguide materials or piezo-electric materials.

By employing materials for the stress applying film which have substantially different thermal expansion coefficients from the underlying material, the waveguide birefringence may be controlled by adjusting the temperatures locally on the structure.

In the choice of material for the stress applying film having a thermal expansion coefficient substantially different from that of the underlying material, this film material may preferably consist at least partly of a conducting material in order to act as a heating element.

If employing piezo-electric material, the waveguide birefringence may be controlled by applying a voltage to the film.

Due to the photo-elastic properties of the core material in the waveguide, waveguide birefringence is thus obtained from the amount of strain induced by the stress fields.

In other words the stress-applying films add substantially to the waveguide birefringence, said birefringence may be controlled by the films.

A section of waveguide with stress applying film constitutes a waveguide element with variable birefringence.

Expedient embodiments of the method are defined hereinbelow.

As mentioned, the invention also relates to an optical component. This optical component and expedient embodiments are defined hereinbelow.

The optical component according to the invention comprises series of waveguide elements with variable birefringence as described above. The optical component thus provides an active polarisation controller.

It is further noted that a silica-glass based polarisation controller may be directly integrated with optical components with other functionalities on the same planar substrate.

In fact the stress-applying film segments may be placed on any substantially flat glass surface to provide a transformation of a SOP of a signal transmitted in any waveguide structure buried under the surface.

It is preferred that the stress-applying film is placed close to the waveguide core but not so close that it interferes substantially with the guided optical mode. For a typical single-mode silica waveguide having a refractive index step of approximately $10^{-2}$ a distance of more than 10 $\mu$m between the waveguide core and the film is preferred.

It is preferred that the stress-applying films are positioned asymmetrically with respect to the waveguide core in order to obtain an angle between the surface normal and the principal axes of the obtained variable waveguide birefringence. By placing the stress-applying films in said asymmetrical manner a preferred angle of 45 degrees between the principal axes of the stress fields of each of the linearly birefringent waveguide segments can be obtained. In other words, a preferred angle between the principal axis of the stress field and the surface normal is 22.5 degrees.

It is preferred that the inherent waveguide birefringence is negligible in comparison with the variable stress-induced birefringence used for the polarisation control.

In a preferred embodiment, the stress-inducing films are arranged in groups such that each group consists of at least one connected film area, and that each group together with the adjacent waveguide segment comprise one element with variable birefringence Also, it is preferred that the length, width, and thickness of each film are chosen so that the amount of controllable stress applied to the waveguide core is sufficient to rotate a state of polarisation a least 180 degrees on the Poincaré sphere in each of the said element.

In another preferred embodiment the said stress-applying films are positioned along the waveguide core such that the principal axes of the obtained variable waveguide birefringence may be rotated by adjusting the temperature of the structure and/or the voltage applied to said films.

Generally it is preferred that the stress-applying film is located at the surface of the structure in order to ease the process of connecting a source of electric current to the films. Moreover, in a preferred embodiment at least one but preferably four waveguide segments with variable birefringence are constructed as described above.

The invention will now be explained more fully below with reference to embodiments shown in the drawing, in which FIG. 1 shows a cross section of the stress-applying film located at the surface of the waveguide structure, and a schematic drawing of the stress fields resulting from a dimensional change of the stress-applying film relative to that of the underlying glass structure.

Figure 1:
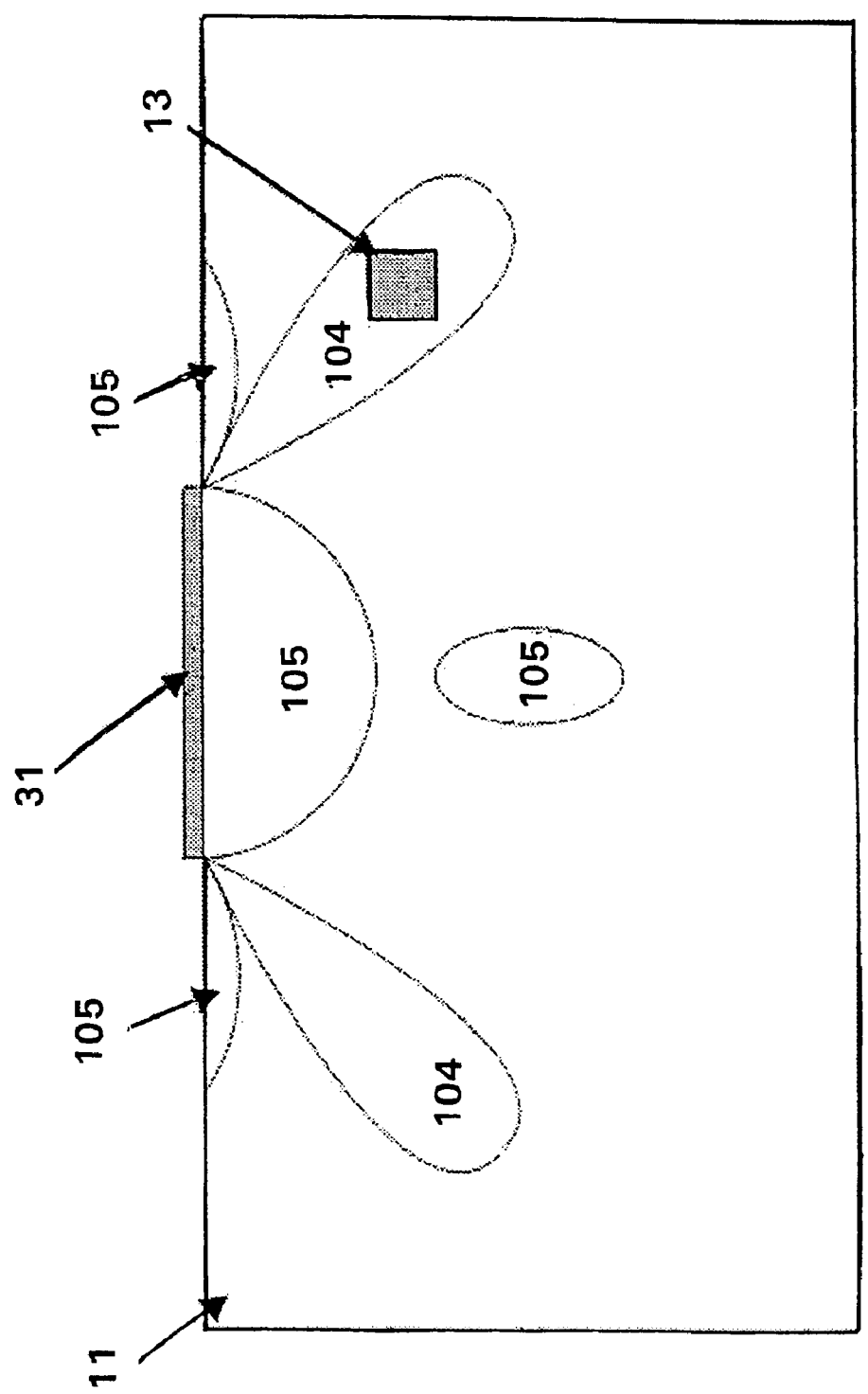
Figure 2:
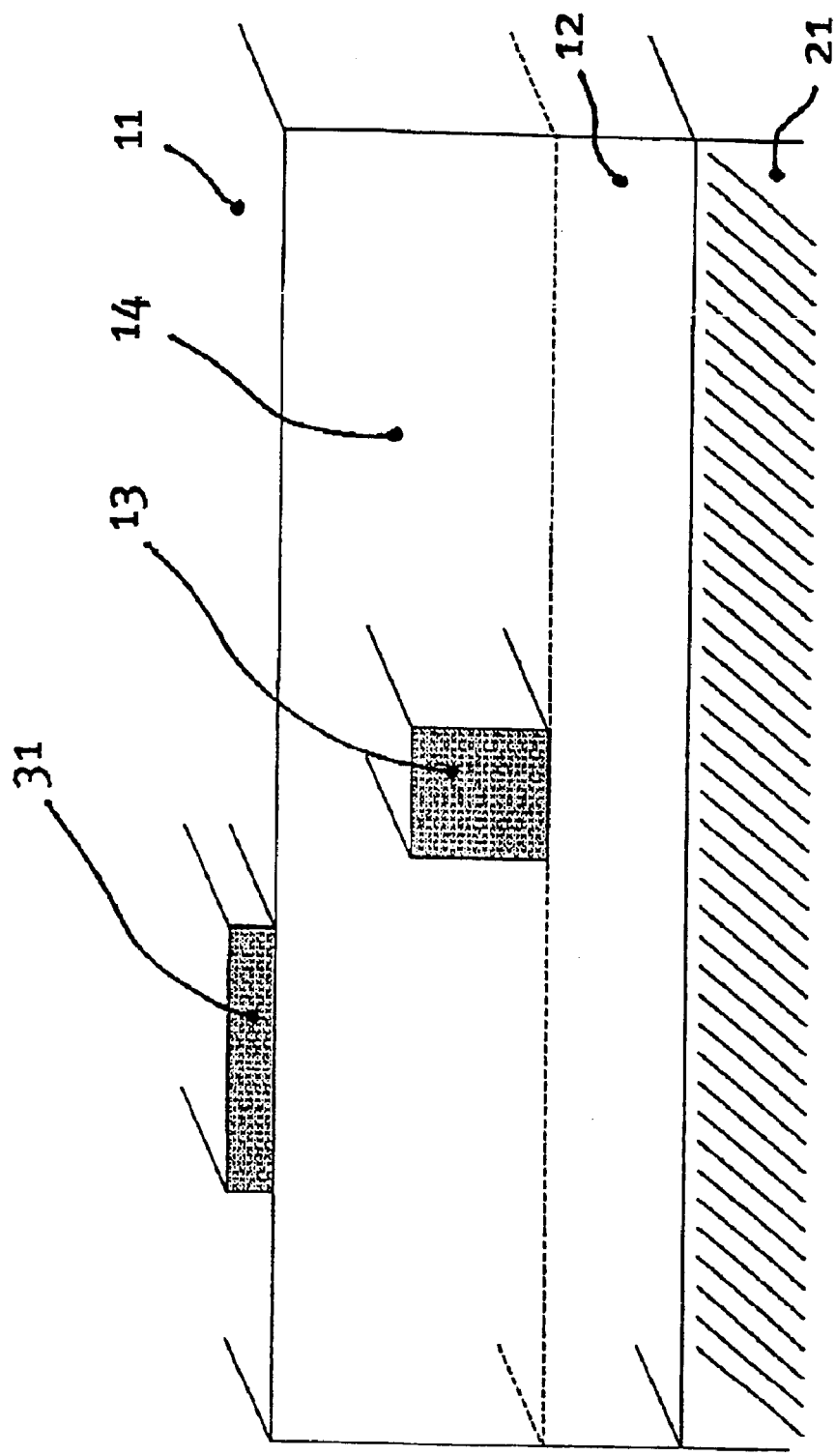
FIG. 2 shows a schematic view of a cross-section of a silicon wafer containing a glass structure with a buried waveguide and a stress-applying film.
Figure 3:
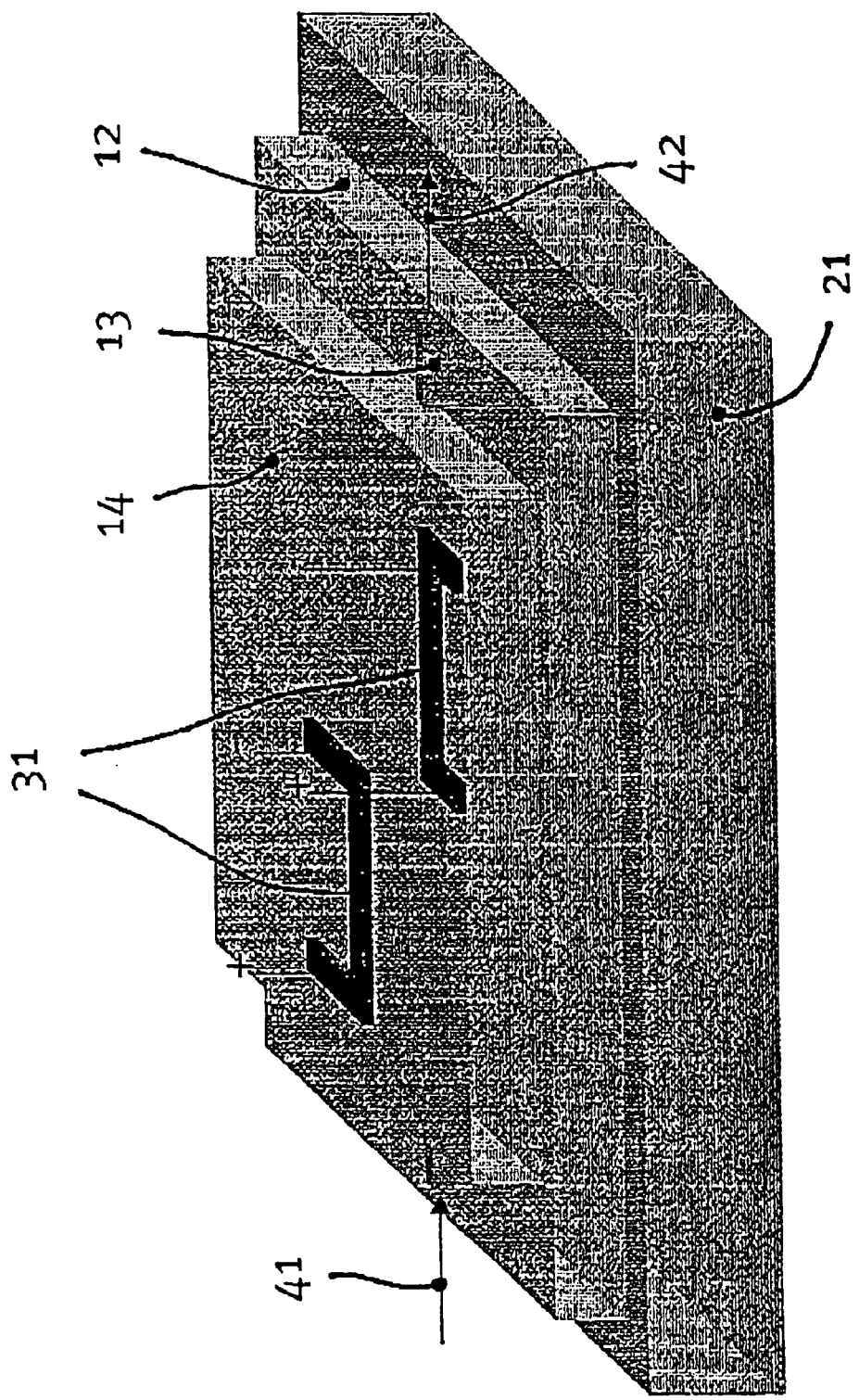
FIG. 3 shows a perspective view of a preferred embodiment of a planar component according to the invention.

The stress-applying film segments 31 as shown in FIGS. 1, 2 and 3 were placed asymmetrically above the waveguide core 13 to achieve the desired angle of 22.5 degrees between the principal axis of the stress field 104 and the surface normal of the waveguide structure 11. In general, the regions 104 are subject to compressive stress, and the regions 105 tensile stress.

The optical waveguide structure 11 as shown in FIG. 2 was prepared by a combination of Plasma-Enhanced Chemical Vapour Deposition (PECVD) and Reactive Ion Etching (RIE). First, a ~12 $\mu$m layer 12 of silica glass was deposited by PECVD on a silicon substrate 21 and annealed.

Second, a core layer of ~5 $\mu$m germanium-doped silica was deposited by PECVD and annealed. Lithography and subsequent reactive ion etching was performed on the core layer to define the waveguide cores 13.

Finally a ~12 $\mu$m cladding layer 14 doped with phosphor and boron was deposited to cover the waveguide core 13. This layer was subsequently annealed.

Note that the glass layers and waveguide structures described above may be produced by other means. For example, the waveguide cores 13 could be prepared by direct UV-writing in a UV-sensitive core glass sandwiched between glass cladding layers, or by ion-exchange in a suitable glass substrate.

The stress-applying film segments 31 as shown in FIGS. 1, 2 and 3 were prepared by electron-beam evaporating a metallic source and re-depositing through a masking layer onto the surface of the component 11.

For the examples shown in the following section, a 3000 Å thick gold layer on top of a 300 Å thick chromium adhesion layer was deposited on the glass surface 11.

However, by evaporating layers of different compositions, the film properties may be tailored to meet specific requirements, such as the amount of stress induced, the adhesion between the glass and film material, and the electric resistance.

Alternatively, the stress-applying films 31 may be prepared by depositing a piezo-ceramic material onto areas of the glass surface 11.

Figure 4:
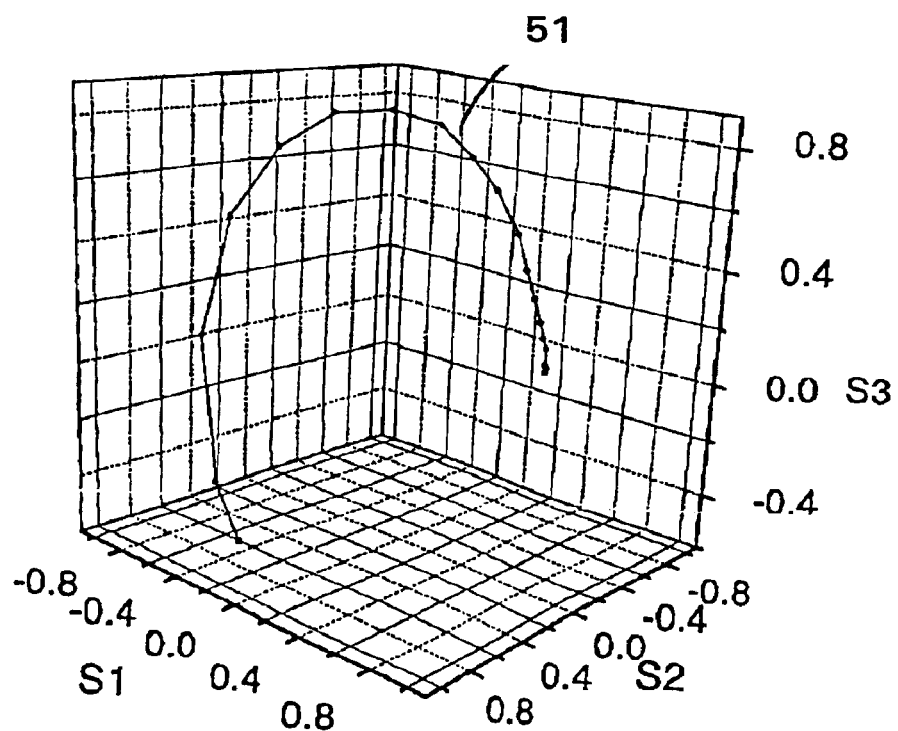
FIG. 4 shows a trace of the output polarisation state on the Poincaré sphere.

In FIG. 4 the trace of the output polarisation state on the Poincaré sphere caused by increasing the electric current through the stress-applying film segment from 0 to 174 mA in steps of 10 mA from 0 to 170 mA. 0 mA correspondonds to the right-hand end of the circle segment, and 174 mA to the lefthand end. Polarisation states were measured by HP 8509 Lightwave Polarisation Analyzer. Note that the fibers used in the measurement setup contribute with polarisation transformation, which however remain constant during the measurements.

Figure 5:
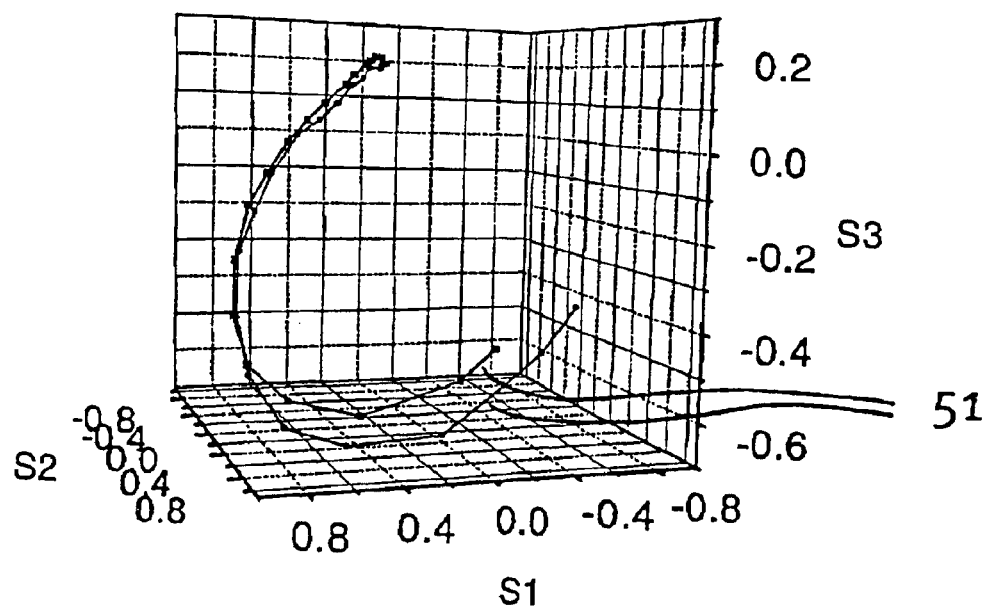
FIG. 5 shows two traces similar to that shown in FIG. 4.

In FIG. 5 two traces similar to that shown in FIG. 4 in which one trace (circles) was obtained by varying the electric current through the first of the two film segments, whereas the second trace (squares) was obtained by varying the electric current through the second film segment. In both cases the current was increased from 0 to 174 mA in steps of 10 mA from 0 to 170 mA.

The invention is further illustrated by the following examples of preparation of a planar optical waveguide with an added stress-applying film structure and of the application of this system for controlling an optical polarisation state.

Example 1

For the purpose of demonstrating the effect a simple component was produced. As shown in FIG. 2 and FIG. 3 a buried waveguide structure 11 was prepared by deposition and etching as described above. An area of said chromium/gold film 31, 3300 Å thick, 10 $\mu$m wide and 4 cm long was deposited on the surface of the glass cladding layer 14 parallel to the waveguide core 13 as shown in FIG. 3. This chromium/gold film 31 comprised both the stress-applying film and the heating element. In total, this structure comprises a single element with variable linear birefringence.

By varying the input-SOP 41 of a transmitted signal, it was found that for two certain orthogonal input-SOP's 41 no transformation of polarisation occurred when changing the current applied to the film. We explain this observation by having found the two input-SOP's 41, which are parallel to the principal axes. However, for any other input-SOP's 41 a transformation could be obtained. In fact, by varying the current applied to the film, the output-SOP 42 could be varied to points on a circle segment 51 on the Poincaré sphere as shown in FIG. 4.

Since the employed stress fields originates in the difference in thermal expansion coefficients between the glass structure 11 and the chromium film 31, the dependence of the optical retardation must be expected to be linear in the power dissipated in the chromium film 31, i.e. proportional to the current squared. Indeed such dependence was observed.

Example 2

A structure similar to that described in example 1 was constructed but with two stress-applying chromium/gold film segments 31 on the surface 11. These film segments 31, 3300 Å thick, 10 $\mu$m wide, and 2 cm long, were arranged parallel to and at opposite sides of the underlying waveguide core 13 as sketched in FIG. 3. This structure comprised two elements with variable birefringence, which may be controlled by applying a voltage to each of the films 31.

Since the stress-applying films 31 are located at opposite sides (see FIG. 3) of the buried waveguide core 13, we expect the two sets of principal axes to be mutually rotated. Therefore, we expect the output-SOP 42 to be variable along two circles, with different rotation axes, on the Poincaré sphere. As shown in FIG. 5 variation of the voltage applied to the two film segments 31 indeed gives rise to two such circles 51 with slightly different rotation axes. It is therefore concluded that the two sets of principal axes are indeed mutually rotated. However, in this example the rotation angle is significantly different from the preferred 45 degrees, which may be explained by a contribution from a large inherent waveguide birefringence.

What is claimed is:

1. Method for controlling the polarization of an optical signal transmitted through an optical waveguide core, comprising the steps of burying the optical waveguide core in a planar structure, and placing a plurality of stress-applying films on a surface of the structure in an asymmetrical manner with respect to the surface normal to the waveguide core and selectably operative to dynamically control the stress originating from said stress-applying films, so as to dynamically control the state of polarization applied to an optical signal passing through the waveguide core.

2. Method according to claim 1, characterized in that said asymmetrical manner comprises placing said stress-applying films such that a well defined angle is created between principal axes of each variable birefringent waveguide segment.

3. Method according to claim 1, characterized in that said stress-applying films comprise materials having a thermal expansion coefficient different from that of the underlying structure.

4. Method according to claim 1, characterized in that said stress-applying films comprise a piezo-electric material.

5. Method according to claim 1, characterized in that the stress-applying film comprises a gold layer having an electrical resistivity deposited on top of a chromium adhesion layer.

6. Method according to claim 1, characterized in that the stress-applying film comprises a metal layer having an electrical resistivity on top of a layer of amorphous silicon.

7. Method according to claim 1, characterized in arranging the films in groups each of which constitute a separate element for controlling waveguide birefringence.

8. An optical component comprising a polarization controller having an optical waveguide core buried in a planar structure, wherein a plurality of stress-applying films is placed on a surface of the structure in an asymmetrical manner with respect to a surface normal to the waveguide core and wherein at least one of the stress-applying films is selectably operative to dynamically control the stress originating from the at least one stress-applying films in response to a control signal applied to the at least one stress-applying film, so as to dynamically control the state of polarization of an optical signal transmitted through the waveguide core.

9. An optical component according to claim 8, characterised in a substrate on which a glass buffer layer is deposited, said glass layer on its top has a glass topcladding with a buried waveguide core produced by a deposit-etch process, said glass topcladding on its top has a number of stress-applying films.

10. An optical component according to claim 8, characterised in a substrate into which buried waveguide cores are produced by ion exchange, said substrate on its top has a number of stress-applying films.

11. An optical component according to claim 8 characterised in a substrate on which a layered glass structure is deposited, into which buried waveguide cores are produced UV-writing, said layered glass structure on its top has a numbers of stress-applying films.

12. An optical component according to claim 8 characterised in a substrate on which a polymer waveguide structure is produced, said polymer waveguide structure on its top has a number of stress-applying films.

13. An optical component according to claim 8 comprising a waveguide structure with a neglible inherent waveguide birefringence.

14. An optical component comprising a polarization controller prepared by the method according to claim 1.

* * * * *